(12) United States Patent
Beneyto-Ferre

(10) Patent No.: US 10,493,352 B2
(45) Date of Patent: Dec. 3, 2019

(54) METHOD AND DEVICE FOR GUIDING A RUNNER OR WALKER ALONG A PREDETERMINED RUNNING OR WALKING PATH

(71) Applicant: PUMA SE, Herzogenaurach (DE)

(72) Inventor: Jordi Beneyto-Ferre, Nürnberg (DE)

(73) Assignee: PUMA SE, Herzogenaurach (DE)

( * ) Notice: Subject to any disclaimer, the term of this patent is extended or adjusted under 35 U.S.C. 154(b) by 277 days.

(21) Appl. No.: 15/523,827

(22) PCT Filed: Nov. 10, 2014

(86) PCT No.: PCT/EP2014/003006
§ 371 (c)(1),
(2) Date: May 2, 2017

(87) PCT Pub. No.: WO2016/074689
PCT Pub. Date: May 19, 2016

(65) Prior Publication Data
US 2017/0319940 A1 Nov. 9, 2017

(51) Int. Cl.
*A41D 1/00* (2018.01)
*A41D 13/01* (2006.01)
(Continued)

(52) U.S. Cl.
CPC .......... *A63B 71/0622* (2013.01); *A41D 1/002* (2013.01); *A41D 3/00* (2013.01);
(Continued)

(58) Field of Classification Search
None
See application file for complete search history.

(56) References Cited

U.S. PATENT DOCUMENTS

| 7,698,101 B2* | 4/2010 | Alten | A43B 5/00 340/5.8 |
| 2003/0137852 A1* | 7/2003 | Rapisarda | A41D 13/01 362/570 |

(Continued)

FOREIGN PATENT DOCUMENTS

| JP | 2006164875 A | 6/2006 |
| JP | 2007314925 A | 12/2007 |
| WO | 2014087200 A1 | 6/2014 |

OTHER PUBLICATIONS

V. Woollaston, Can't read a map? Don't worry—this JACKET will guide you . . . , Nov. 12, 2013, pp. 1 and 2, XP055188910 (not available).

(Continued)

*Primary Examiner* — Thomas G Black
*Assistant Examiner* — Demetra R Smith-Stewart
(74) *Attorney, Agent, or Firm* — Lucas & Mercanti, LLP

(57) ABSTRACT

A method and device for guiding a runner along a predetermined running path including the steps: a) Determining the actual position of the runner by a GPS module; b) Assigning the actual position of the runner to a position along the predetermined path; c) Determining if the runner has to continue the predetermined path c1) straight ahead, or c2) by turning to the left or c3) by turning to the right; d) Controlling at least two light emitting elements arranged at or in a garment worn by the runner, wherein at least one left light emitting element is located in a left hand region of the garment and at least one right light emitting element is located in a right hand region of the garment, wherein d1) no activation of the light emitting elements is carried out in above case c1), d2) at least one left light emitting element is activated in above case c2), and d3) at least one right light emitting element is activated in above case c3).

5 Claims, 3 Drawing Sheets

(51) Int. Cl.
    *G01C 21/20*     (2006.01)
    *B60Q 1/36*     (2006.01)
    *A63B 71/06*     (2006.01)
    *A63B 69/00*     (2006.01)
    *A41D 3/00*     (2006.01)
    *A41D 27/20*     (2006.01)

(52) U.S. Cl.
    CPC ........... *A41D 13/01* (2013.01); *A41D 27/205* (2013.01); *A63B 69/0028* (2013.01); *G01C 21/20* (2013.01); *A41D 2600/10* (2013.01); *A63B 2071/0661* (2013.01); *A63B 2071/0694* (2013.01); *A63B 2207/02* (2013.01); *A63B 2220/12* (2013.01); *A63B 2225/50* (2013.01)

(56) References Cited

U.S. PATENT DOCUMENTS

| | | | | |
|---|---|---|---|---|
| 2008/0218310 A1* | 9/2008 | Alten | ................... | A43B 3/0005 340/5.8 |
| 2011/0277206 A1* | 11/2011 | Sokolowski | ....... | A61B 5/02438 2/69 |
| 2014/0343843 A1* | 11/2014 | Yanku | ................... | G01C 21/26 701/491 |

OTHER PUBLICATIONS

J. Abel, "Coming soon: vibrating flashing-light GPS jackets?", Dec. 11, 2013, pp. 1-1, XP055188897 (not available).
International Search Report and Written Opinion dated Aug. 25, 2015 for PCT/EP2014/003006.
IPRP dated Jan. 27, 2017 for PCT/EP2014/003006.

* cited by examiner

METHOD AND DEVICE FOR GUIDING A RUNNER OR WALKER ALONG A PREDETERMINED RUNNING OR WALKING PATH

The present application is a 371 of International application PCT/EP2014/003006, filed Nov. 10, 2014, the priority of this application is hereby claimed and this application is incorporated herein by reference.

BACKGROUND OF THE INVENTION

The invention relates to a method for guiding a runner or walker along a predetermined running or walking path. Furthermore, the invention relates to a device for guiding the runner or walker along the predetermined running path.

When a runner or walker wants to become sporty active in an unknown area problems can occur with respect to the orientation. Sometimes it is necessary that someone describes a suitable running or walking path to the sportsperson. This is specifically the case when a sportsperson wants for example to jog through an area along a running path which is unknown to the person. Sometimes, signs are arranged to show the running path; this is of only limited benefit at night. If a running path was explained to the sportsperson he or she must remember the same; this is specifically critical in the case that the course has a lot of curves.

SUMMARY OF THE INVENTION

Thus, it is an object of the invention to propose a method and a device by which it is possible to get a safe and easy orientation even in the case that the running or walking path is absolutely unknown to the sportsperson. Thus, an easy and effective navigation during sports should be allowed along a running or walking path.

The solution of this object according to the invention is characterized in that the method comprises the steps:
a) Determining the actual position of the runner or walker by means of a GPS module;
b) Assigning of the actual position of the runner or walker to a position along the predetermined running or walking path;
c) Determining if the runner or walker has to continue the predetermined running or walking path
   c1) straight ahead or
   c2) by turning to the left or
   c3) by turning to the right;
d) Controlling of at least two light emitting elements which are arranged at or in a garment which is worn by the runner or walker, wherein at least one left light emitting element is located in a left hand region of the garment and wherein at least one right light emitting element is located in a right hand region of the garment, wherein
   d1) no activation of the light emitting elements is carried out in above case c1),
   d2) at least one left light emitting element is activated in above case c2) and
   d3) at least one right light emitting element is activated in above case c3).

This method steps are preferably repeated and carried out periodically until the runner or walker has reached the end of his or her running or walking path.

The GPS module can be used which is located in a smart phone, wherein the smart phone is arranged in a receiving chamber in the garment or is held by a holding device in or at the garment.

The communication between the GPS module and a control element which controls the light emitting elements occurs preferably wireless. Specifically, the wireless communication can be a Blue Tooth connection which needs not to be described in detail here as it is well known in the art.

The activation of the light emitting elements according to above steps d2) and d3) can be controlled in dependence from the distance to the point where the runner or walker has to turn according to above steps c2) and c3). This alerts the runner or walker beneficially sufficiently before a turn has to be carried out. One possibility is there that the activation of the light emitting elements is changed with respect to the intensity of the activation of the light emitting elements (more or less light intensity). Another possibility is here that the activation of the light emitting elements is changed by interrupting their activation periodically. The light emitting elements can flash periodically prior the location where the turn has to be done; at the respective point a non-stop illumination can take place to signal to the runner or walker that he or she has to turn now. Also, it is possible that the activation of the light emitting elements is changed with respect to the color which is emitted by the light emitting element; if different LEDs with different colors are used the color can change when the point to turn is reached.

The device for guiding a runner or walker along a predetermined running or walking path is characterized in that it comprises:
   a garment worn by the runner or walker comprising at least one left light emitting element which is located at a left hand section of the garment and at least one right light emitting element which is located at a right hand section of the garment,
   a receiving chamber or holding device for receiving or holding of a smart phone which comprises a GPS module,
   a control element for controlling the activation of the light emitting elements in accordance with a signal emitted by the smart phone and
   connection means for connecting the control element with the smart phone.

The connection means comprise preferably elements for establishing a Blue Tooth connection.

The receiving chamber can be a pocket in the inner side of the garment.

The light emitting elements are preferably optic fibers (glass fibers) which are fixed to the arm sleeves of the garment.

Preferably, each one single light emitting element is arranged in the left and in the right region of the garment.

The garment has preferably two arm sleeves which reach down at least to the elbow of the runner or walker.

The garment is preferably a runner's jacket.

Thus, the invention is basing on the idea that a smart phone with its GPS navigation function is used to deliver an effective tool for a runner or walker to get an orientation in an unknown area. He or she is guided by means of an optical signal along the path which is stored in the smart phone by use of an appropriate smart phone app.

It has to be understood that a turn to the left or a turn to the right according to the above explanation does not necessarily mean a turn around of 90°. Also, it can be optically signaled that a slight turn to the right or to the left should be carried out which is below 90°—as to case may be according to the running or walking path. It can be provided that the optical signal is less intensive when only a slight turn to the left or to the right is necessary.

Thus, it is an important aspect of the concept of the present invention that a smart phone is used, especially to assist during physical training (running) Beneficially, at least two distinct optical elements (optic fibers/glass fibers) are anchored in a garment, one on the left side and one on the right side of the same.

The optical elements (optic fibers/glass fibers) are connected with a Blue Tooth device which communicates with the smart phone which is worn during the physical training. According to the situation and controlled by the smart phone light is emitted via the Blue Tooth device into the distinct optic fibers. So, a direction (left/right) can be indicated to the wearer of the garment to guide along a running path.

In the drawings an embodiment of the invention is shown.

DETAILED DESCRIPTION OF THE INVENTION

Figure 1:
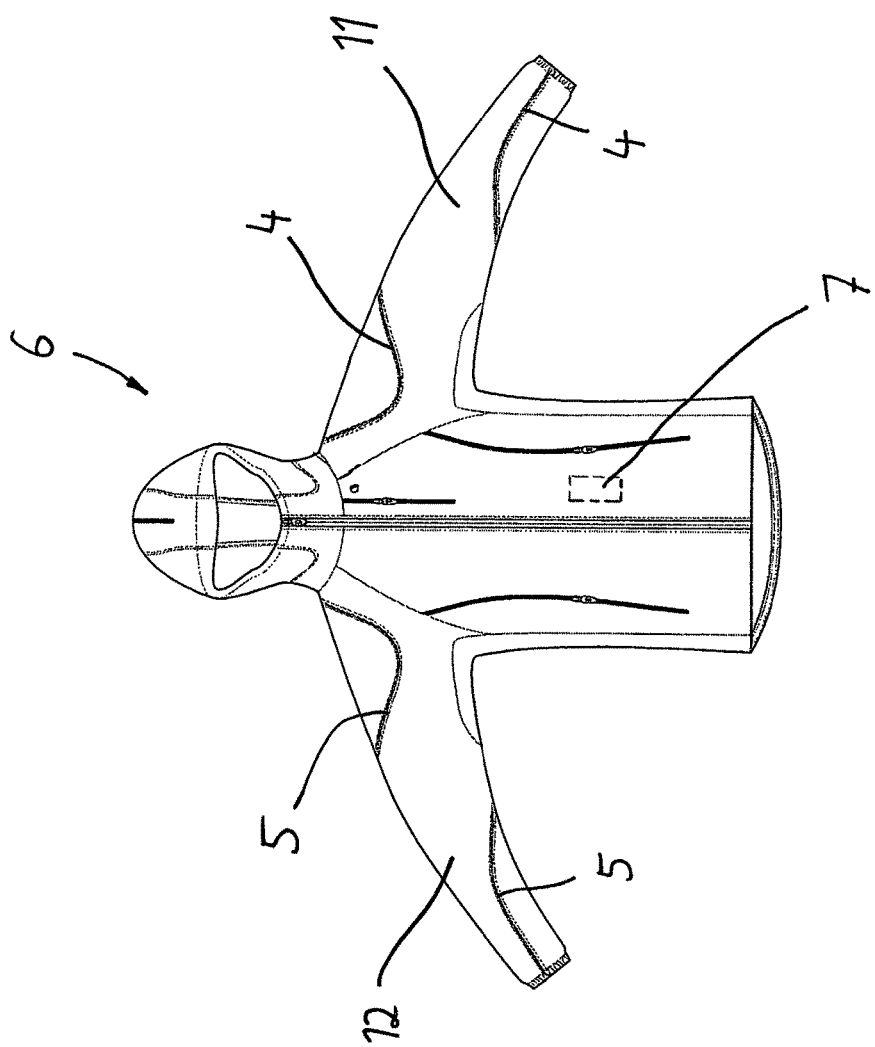
FIG. 1 shows the front view of a sports garment being a running jacket.

In FIG. 1 a garment 6 being a runner's jacket is shown which has two (long) arm sleeves 11 and 12. In the inner of the garment 6 a receiving chamber 8 (see FIG. 3) is arranged in which a smart phone 7 is inserted. As a special feature two light emitting elements 4, 5 are arranged in the garment 6. A left light emitting element 4 extends along the left arm sleeve 11 and a right light emitting element 5 extends along the right arm sleeve 12.

Figure 3:
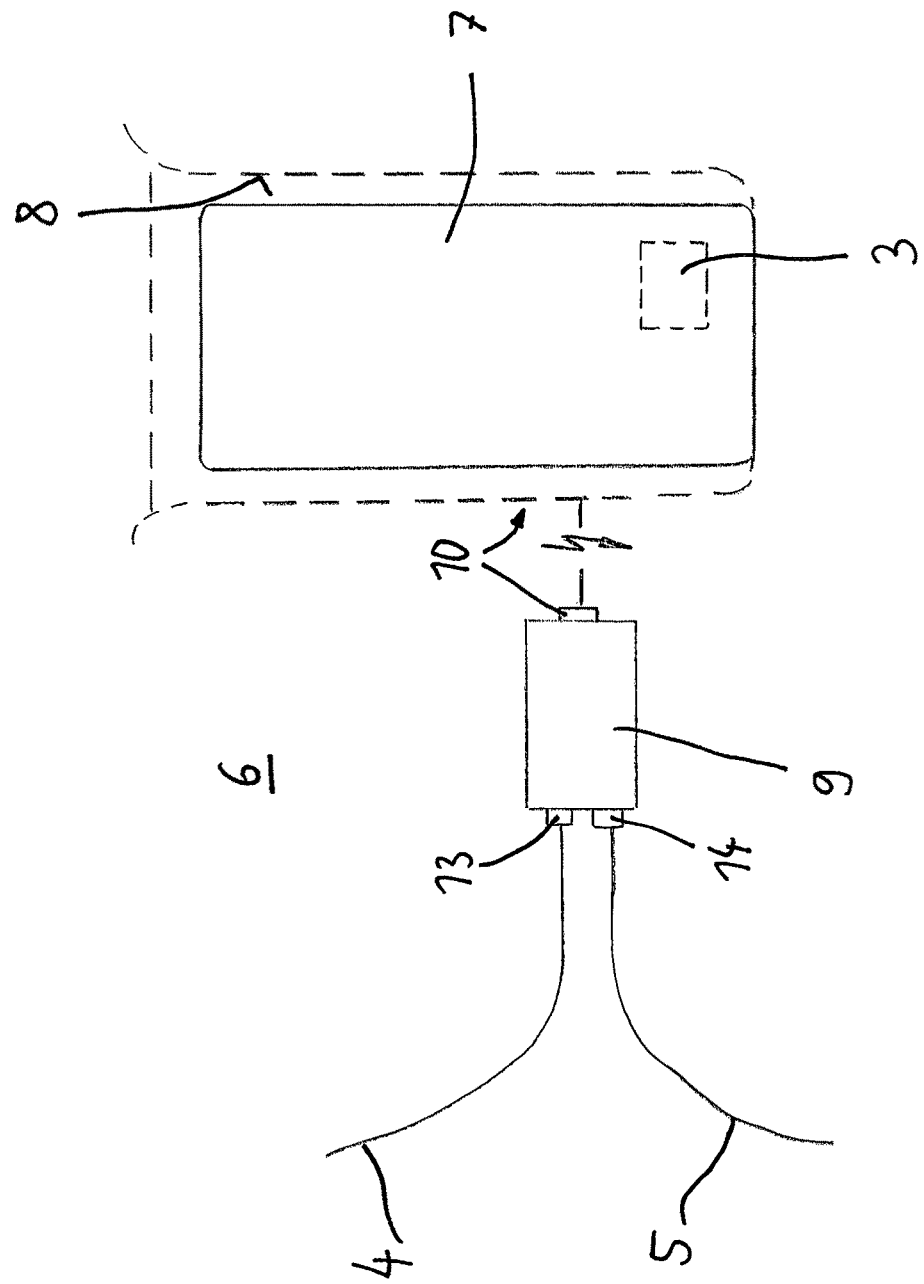

In FIG. 3 details of the arrangement are shown schematically. The receiving chamber 8 in the garment 6 is shown in which the smart phone 7 is inserted. The smart phone 7 has a GPS module 3, as usual, i. e. the exact position of the wearer of the smart phone 7 can be detected. The smart phone 7 can communicate via connection means 10 (being a Blue Tooth connection in the present case) with a control element 9 which is mounted in the garment 6.

In the smart phone 7 an app is installed which is able to store the walking path 2, i. e. a running route (see dashed line in FIG. 2); the runner (i. e. wearer of the garment 6) wants to run the stored running path 2.

For assisting in the navigation respectively orientation along the running path 2 the app which is running in the smart phone 7 transfers signals via the Blue Tooth connection 10 to the control element 9. The control element 9 has two light emitting diodes (LEDs) 13 and 14 which can be switched by the control element 9. The LEDs 13 and 14 are connected with the left light emitting element 4 and the right light emitting element 5. Consequently, according to the detected position of the smart phone 7 and thus of the runner and according to the stored running path 2 light signals can be displayed via the left or the right light emitting element 4, 5 (i. e. via the optic fibers which are anchored in the garment 6).

Figure 2:
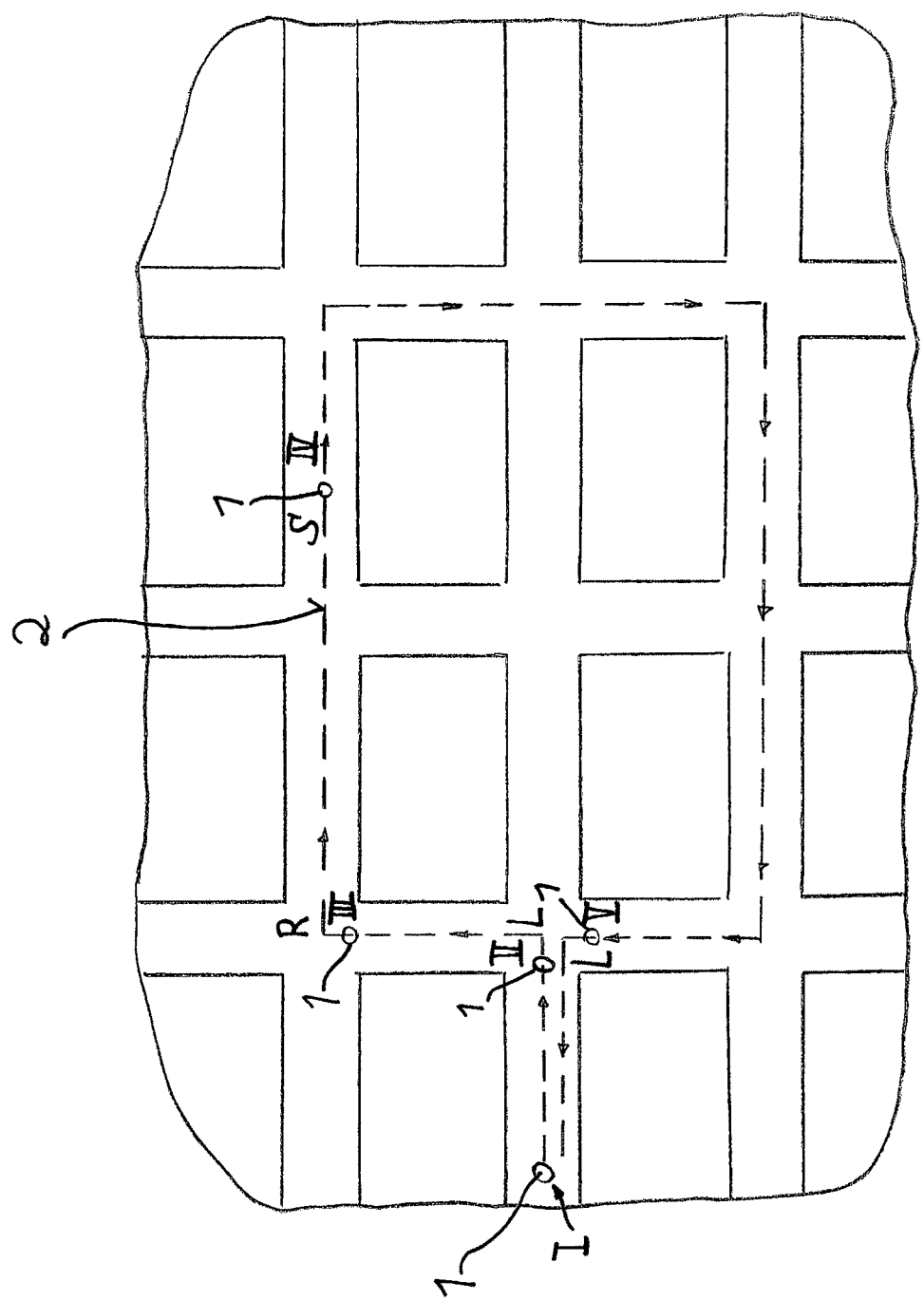
FIG. 2 shows the top plan view onto a running course with a running path depicted in dashed lines and FIG. 3 shows schematically a part of the sports garment according to the invention.

This is depicted in FIG. 2 which shows the top plan view of a forest or the like which is selected by the runner 1 for doing his running along a defined running path 2 (shown with dashed lines).

The running path 2 starts at point I which is also the end point of the running path 2. The running path has to be passed along the arrows. The actual position of the runner 1 is surveyed by means of the GPS module 3 in the smart phone 7 and compared with the stored running path 2.

When the runner 1 approached the point II the comparison of the actual position of the runner 1 with the running path 2 shows that a turn to the left L is necessary to follow the running path 2. Thus, when the runner 1 approaches point II the control element 9 activates the LED 13 by which the left light emitting element 4 is illuminated. So the runner 1 gets a hint to turn to the left.

Accordingly, when the runner 1 approached point III the control element 9 activates the light emitting diode 14 to illuminate the right light emitting element 5. Thus, the runner 1 is alerted to turn to the right R.

As long as the runner 1 has to continue his or her run straight ahead S—see for example point IV—no light emitting element 4, 5 is activated.

In this manner the runner 1 is guided along the whole running path 2. Finally, the runner reaches point V at which a last turn to the left L must be carried out. Thus, the left light emitting element 4 is activated by means of the control element 9 a last time.

So, the stored running path 2 is passed by the runner 1 according to the stored data in the app of the smart phone 7 and is directed in an optical manner along the running path 1.

REFERENCE NUMERALS

1 Runner/walker
2 Running/walking path
3 GPS module
4 Left light emitting element
5 Right light emitting element
6 Garment
7 Smart phone
8 Receiving chamber
9 Control element
10 Connection means
11 Arm sleeve
12 Arm sleeve
13 Light emitting diode
14 Light emitting diode
S Straight ahead
L Turning to the left
R Turning to the right

The invention claimed is:

1. A method for guiding a runner or walker along a predetermined running or walking path, wherein the method comprises the steps:
   a) determining an actual position of the runner or walker by a GPS module;
   b) assigning the actual position of the runner or walker to a position along the predetermined running or walking path;
   c) determining if the runner or walker has to continue the predetermined running or walking path
      c1) straight ahead or
      c2) by turning to the left or
      c3) by turning to the right,
   d) controlling at least two light emitting elements which are arranged at or in a garment which is worn by the runner or walker, wherein at least one left light emitting element is located in a left hand region of the garment and wherein at least one right light emitting element is located in a right hand region of the garment, wherein the at least two light emitting elements are optical fibers arranged in arm sleeves of the garment, and
- d1) no activation of the light emitting elements is carried out in above case c1),
- d2) the at least one left light emitting element is activated in above case c2), and
- d3) the at least one right light emitting element is activated in above case c3), wherein the activation of the light emitting elements according to steps d2) and d3) is controlled in dependence from the distance to the point where the runner or walker has to turn according to steps c2) and c3) and wherein the activation of the light emitting elements is changed with respect to the color which is emitted by the light emitting elements.

2. The method according to claim 1, wherein the GPS module is located in a smart phone, wherein the smart phone is arranged in a receiving chamber in the garment or is held by a holding device in or at the garment.

3. The method according to claim 1, wherein the communication between the GPS module and a control element which controls the light emitting elements is wireless.

4. The method according to claim 3, wherein the wireless communication is a Blue Tooth connection.

5. The method according to claim 1, wherein the at least one left light emitting element extends along a length of a left sleeve of the arm sleeves of the garment and the at least one right light emitting element extends along a length of a right sleeve of the arm sleeves of the garment.

* * * * *